(12) United States Patent
Kon et al.

(10) Patent No.: US 12,134,314 B2
(45) Date of Patent: Nov. 5, 2024

(54) FILL-UP RESTRICTION VALVE

(71) Applicant: PIOLAX, INC., Kanagawa (JP)

(72) Inventors: Takuma Kon, Kanagawa (JP); Kenta Mihara, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 0 days.

(21) Appl. No.: 17/982,852

(22) Filed: Nov. 8, 2022

(65) Prior Publication Data

US 2023/0144508 A1 May 11, 2023

(30) Foreign Application Priority Data

Nov. 9, 2021 (JP) ................................. 2021-182253

(51) Int. Cl.
*B60K 15/03* (2006.01)
(52) U.S. Cl.
CPC .................. *B60K 15/03006* (2013.01); *B60K 2015/03019* (2013.01); *B60K 2015/03026* (2013.01); *B60K 2015/03289* (2013.01)
(58) Field of Classification Search
None
See application file for complete search history.

(56) References Cited

U.S. PATENT DOCUMENTS

| 5,566,705 A * | 10/1996 | Harris | F16K 24/042 |
| | | | 137/493 |
| 9,050,886 B2 * | 6/2015 | Honda | B60K 15/03519 |
| 9,783,046 B2 * | 10/2017 | Sui | F16K 24/044 |
| 2011/0005609 A1 * | 1/2011 | Suzuki | B60K 15/03519 |
| | | | 141/59 |
| 2019/0070954 A1 * | 3/2019 | Mukasa | B60K 15/035 |

FOREIGN PATENT DOCUMENTS

JP         5767947 B2     8/2015

* cited by examiner

*Primary Examiner* — Angelisa L. Hicks
(74) *Attorney, Agent, or Firm* — Paratus Law Group, PLLC

(57) ABSTRACT

There is provided a fill-up restriction valve including: a housing; and a float valve. The housing includes a housing body including a body-side peripheral wall, and a lower cap including a cap-side peripheral wall, the lower cap being installed to a lower side of the housing body by a joint portion. The joint portion includes an annular groove, an insertion wall portion, and an annular protrusion formed on one of the insertion wall portion and the annular groove, or an annular seal member disposed between the insertion wall portion and the annular groove. The annular protrusion or the annular seal member is configured to be in pressure-contact with the annular groove and the insertion wall portion in a state where the insertion wall portion is inserted into the annular groove.

5 Claims, 11 Drawing Sheets

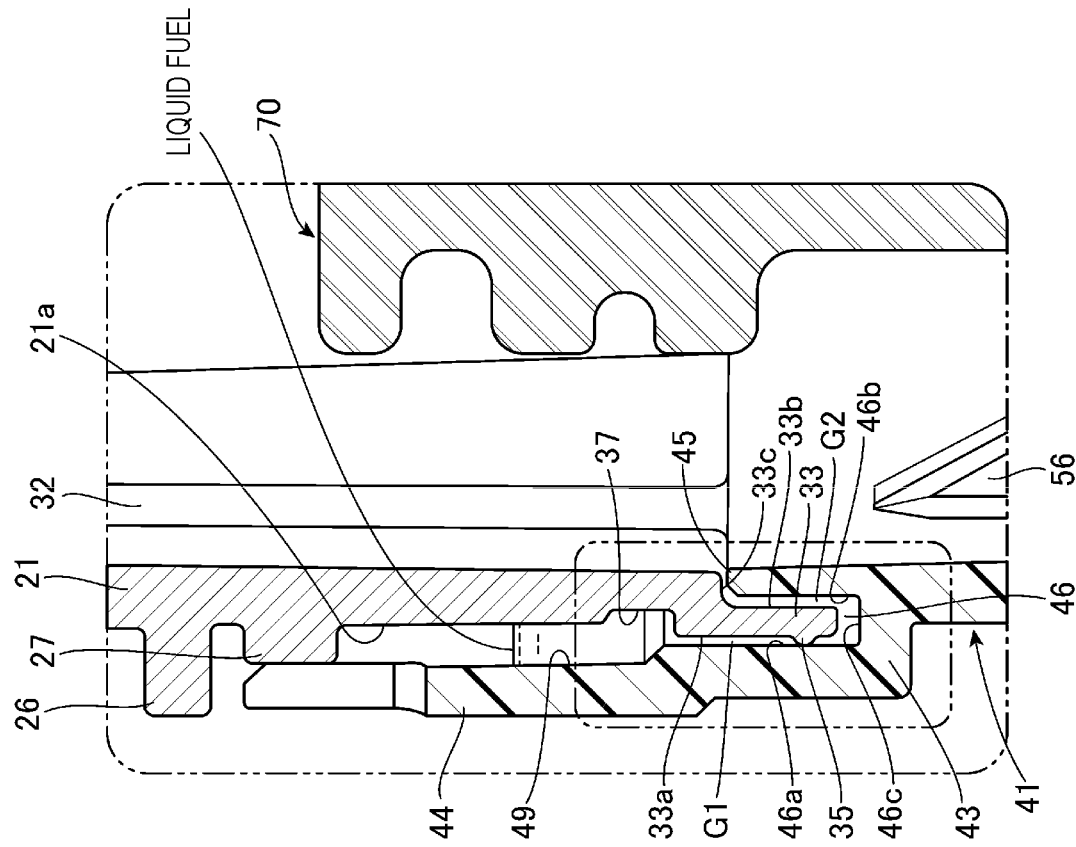
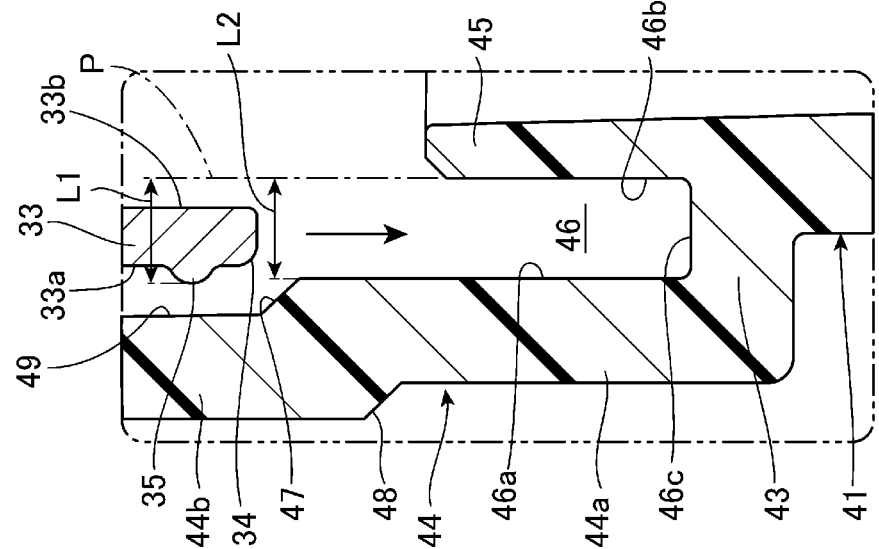

FIG. 9B
FIG. 9A
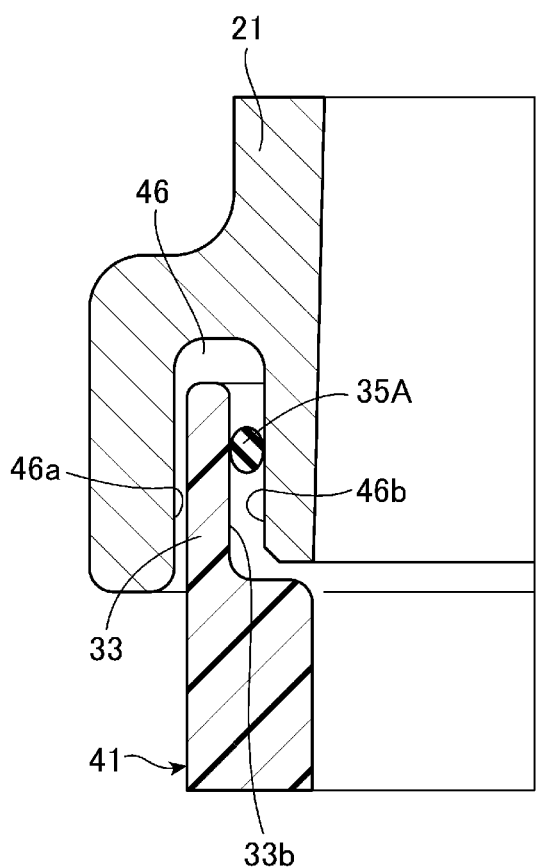
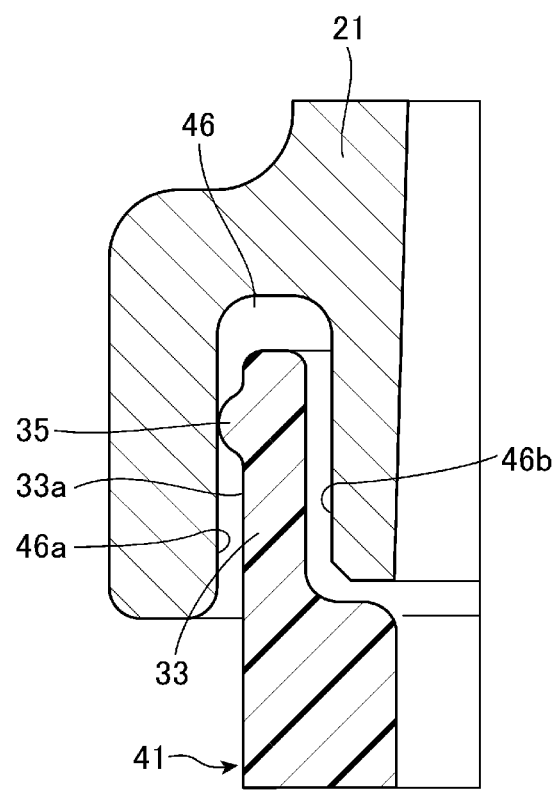

FILL-UP RESTRICTION VALVE

CROSS-REFERENCE TO RELATED APPLICATIONS

This application is based on Japanese Patent Application No. 2021-182253 filed on Nov. 9, 2021, the contents of which are incorporated herein by way of reference.

TECHNICAL FIELD

The present invention relates to a fill-up restriction valve that suppresses excessive refueling to a fuel tank.

BACKGROUND

A fuel tank may be provided with a fill-up restriction valve that detects fill-up at the time of refueling and closes to suppress excessive refueling.

An example of this type of valve includes an exhaust valve device of a fuel tank described in Patent Literature 1. The exhaust valve device includes a cylindrical upper structure having a passage therein that communicates inside and outside of the fuel tank, a lower structure including a float support piece protruding from an inner peripheral surface and an upper end portion into which a lower end portion of the upper structure is fitted, and a float valve supported between the upper structure and the float support piece in a manner of being movable up and down and configured to close the passage. The upper structure includes a plurality of first locking claws protruding on an outer peripheral surface of the lower end portion fitted into the lower structure. The lower structure has a plurality of first locking holes with which the plurality of first locking claws engage, respectively The lower structure includes, in order from an upper end, a ring portion having a constant diameter, a tapered portion having a diameter decreasing downward, an intermediate portion having a constant diameter and formed with a first locking hole, and a skirt portion having a lower opening. The intermediate portion of the lower structure has, in an inner periphery thereof, a fitting groove into which the lower end portion of the upper structure is fitted.

Since the first locking claws of the upper structure are engaged with the first locking holes of the lower structure, and the lower end portion of the upper structure is fitted and inserted into the fitting groove of the lower structure, the upper structure is joined to the lower structure. When a fuel liquid level is located in the lower opening of the skirt portion of the lower structure by refueling to the fuel tank, air in the fuel tank is restricted from being discharged, so that the fill-up is restricted.

Patent Literature 1: JP5767947B

In the exhaust valve device of Patent Literature 1, a fitting portion between the lower end portion of the upper structure and the fitting groove of the lower structure is located above the lower opening of the skirt portion of the lower structure that serves as a fill-up detection opening. For this reason, when the sealing performance of the fitting portion deteriorates and air escapes from the fitting portion, the fill-up may not be restricted at a predetermined fuel liquid level and the fill-up detection accuracy may deteriorate.

Therefore, an object of the present invention is to provide a fill-up restriction valve that can improve sealing performance between a housing body and a lower cap and improve fill-up detection accuracy.

SUMMARY

There is provided a fill-up restriction valve including: a housing, in which a valve chamber configured to communicate with inside of a fuel tank is provided on a lower side by a partition wall, a ventilation chamber configured to communicate with outside of the fuel tank is provided on an upper side by the partition wall, and an opening configured to communicate the valve chamber with the ventilation chamber is formed in the partition wall; and a float valve accommodated in the valve chamber in a manner of being movable up and down, the float valve configured to close the opening when a fuel liquid level rises to a predetermined height during refueling into the fuel tank. The housing includes a housing body including a body-side peripheral wall, and a lower cap including a cap-side peripheral wall, the lower cap being installed to a lower side of the housing body by a joint portion. The joint portion includes an annular groove provided in one of an upper end portion of the cap-side peripheral wall and a lower end portion of the body-side peripheral wall, an insertion wall portion provided on the other one of the upper end portion of the cap-side peripheral wall and the lower end portion of the body-side peripheral wall, the insertion wall portion configured to be inserted into the annular groove, and an annular protrusion formed on one of the insertion wall portion and the annular groove, or an annular seal member disposed between the insertion wall portion and the annular groove. The annular protrusion or the annular seal member is configured to be in pressure-contact with the annular groove and the insertion wall portion in a state where the insertion wall portion is inserted into the annular groove.

BRIEF DESCRIPTION OF DRAWINGS

FIG. 7A is an enlarged sectional view of a main portion in a state where the housing body and the lower cap are installed, and FIG. 7B is an enlarged sectional view of a main portion in a state before the housing body and the lower cap are installed.

FIG. 9A is an enlarged cross-sectional view of a first modification of a joint portion of the fill-up restriction valve, and FIG. 9B is an enlarged cross-sectional view of a second modification of the joint portion of the fill-up restriction valve.

DESCRIPTION OF EMBODIMENTS

Embodiment of Fill-up Restriction Valve

Figure 1:
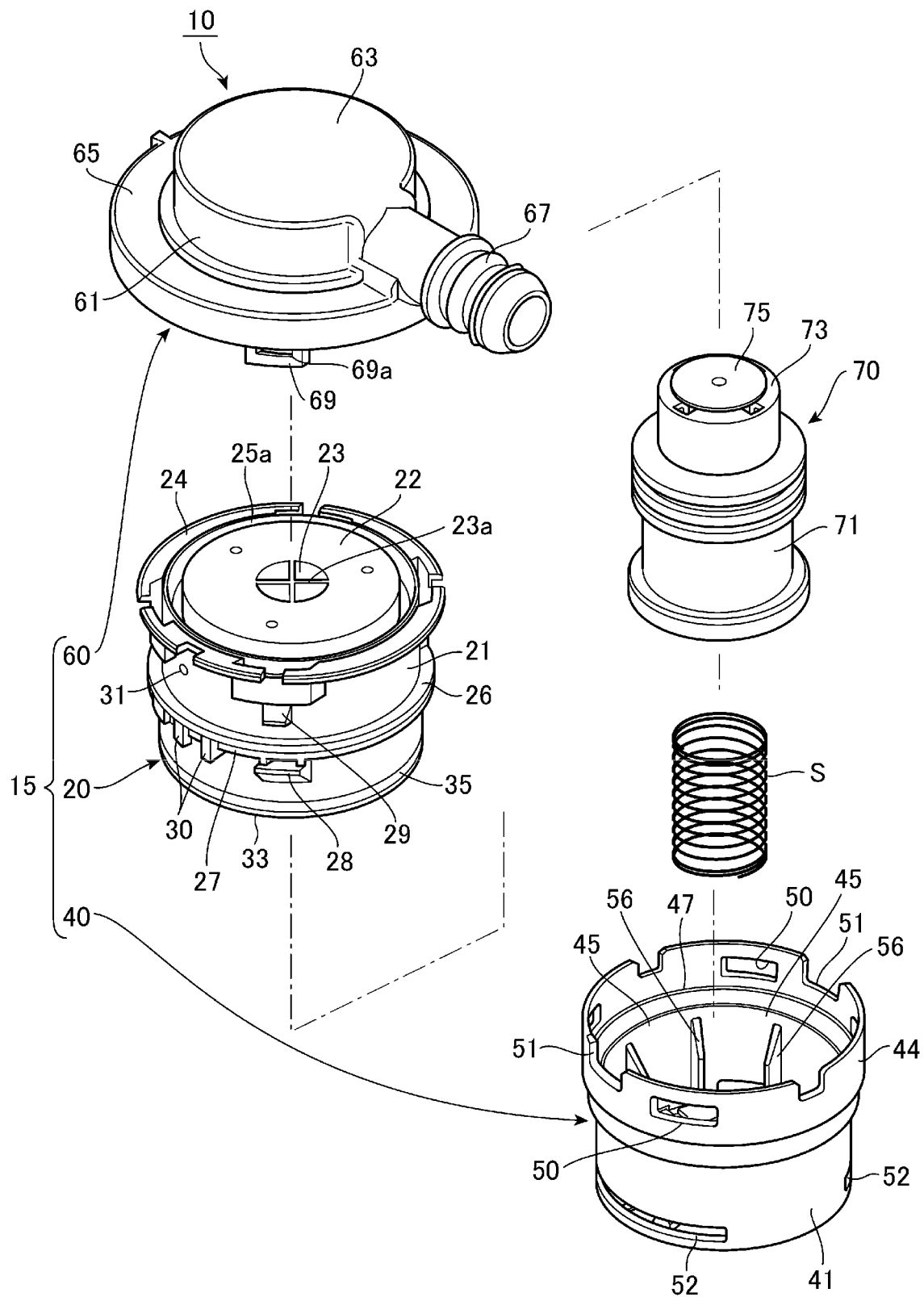
FIG. 1 is an exploded perspective view showing an embodiment of a fill-up restriction valve according to the present invention.

Hereinafter, an embodiment of a fill-up restriction valve according to the present invention will be described with reference to the drawings.

As shown in FIGS. 1 to 4, a fill-up restriction valve 10 in the embodiment includes a housing 15 and a float valve 70. In the housing 15, a valve chamber V communicating with inside of a fuel tank is provided on a lower side by a partition wall 22, a ventilation chamber R communicating with outside of the fuel tank is provided on an upper side by the partition wall 22, and an opening 23 communicating the valve chamber V with the ventilation chamber R is formed in the partition wall 22. The float valve 70 is accommodated in the valve chamber V in a manner of being movable up and down, and closes the opening 23 when a fuel liquid level rises to a predetermined height at the time of refueling the inside of the fuel tank.

The housing 15 in the embodiment further includes a housing body 20 including a body-side peripheral wall 21, a lower cap 40 including a cap-side peripheral wall 41 and installed to a lower side of the housing body 20 by a joint portion, and an upper cover 60 installed to the housing body 20. The fill-up restriction valve 10 further includes, between the lower cap 40 and the float valve 70, a biasing spring S that biases the float valve 70.

Figure 4:
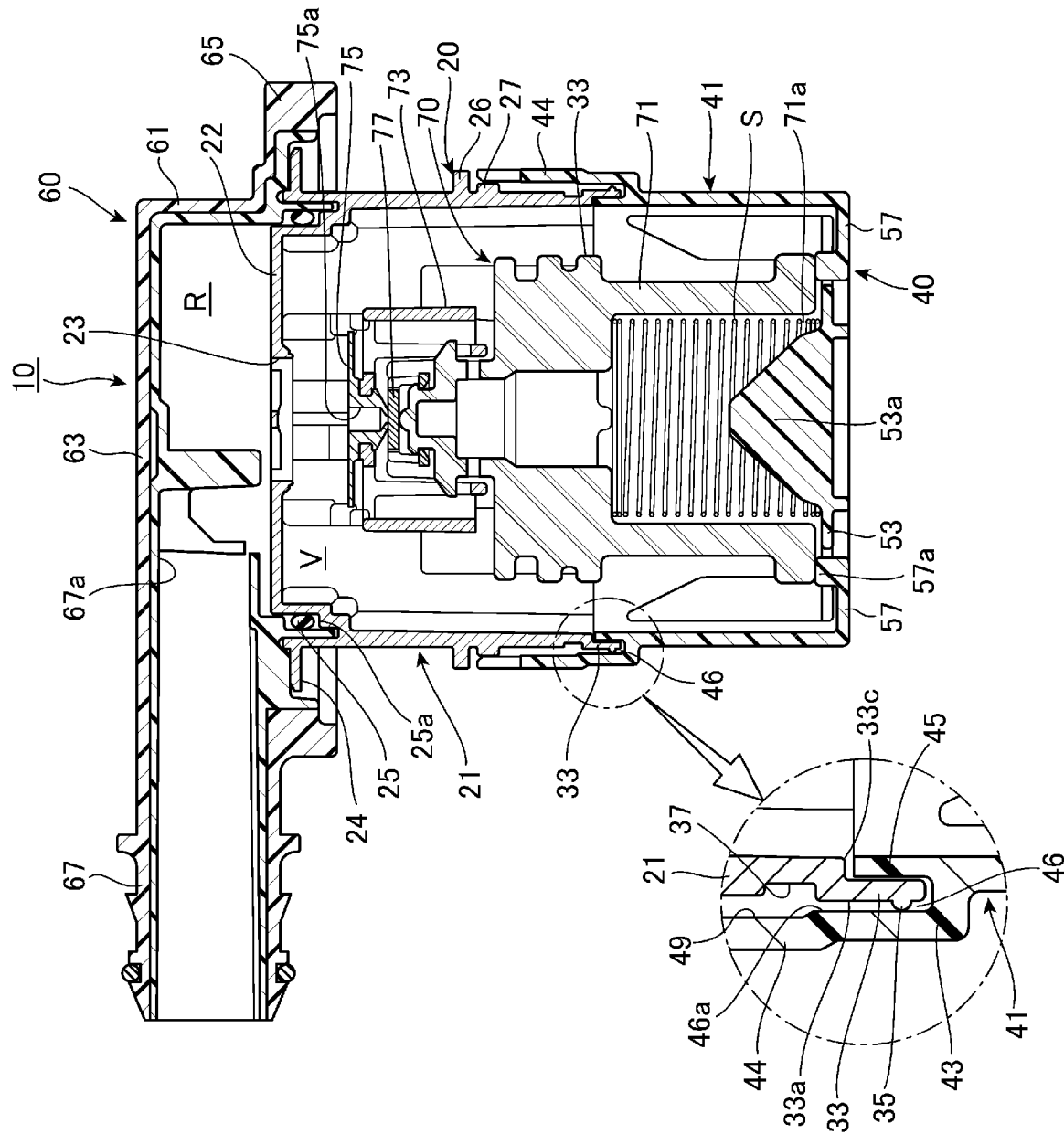
FIG. 4 is a cross-sectional view taken along a line A-A of FIG. 2.

In the embodiment, as shown in FIGS. 4 and 7, the joint portion that installs the lower cap 40 to the lower side of the housing body 20 includes an annular groove 46 provided in an upper end portion of the cap-side peripheral wall 41, an insertion wall portion 33 provided on a lower end portion of the body-side peripheral wall 21 and inserted into the annular groove 46, and an annular protrusion 35 formed on an outer side surface 33a of the insertion wall portion 33. In a state where the insertion wall portion 33 is inserted into the annular groove 46, the annular protrusion 35 is in pressure-contact with the annular groove 46 and the insertion wall portion 33.

In the following description. "fuel" means liquid fuel (including droplets of fuel), and "fuel vapor" means evaporated fuel.

First, the housing body 20 will be described with reference to FIGS. 1, 4, 5, and the like.

The housing body 20 includes the body-side peripheral wall 21 having a substantially cylindrical shape, and above the body-side peripheral wall 21, the partition wall 22 having a substantially disc shape is disposed. The partition wall 22 is formed with the opening 23 at a center thereof in the radial direction. The opening 23 is formed with a plurality of ribs 23a on an inner side thereof, so that the opening 23 has a lattice hole shape by the ribs 23a. The body-side peripheral wall 21 includes a flange portion 24 projecting from an upper outer periphery thereof. The flange portion 24 is formed with a ring install groove 25a on an inner side thereof, and an annular seal ring 25 is attached to the ring install groove 25a (see FIG. 4).

Figure 5:
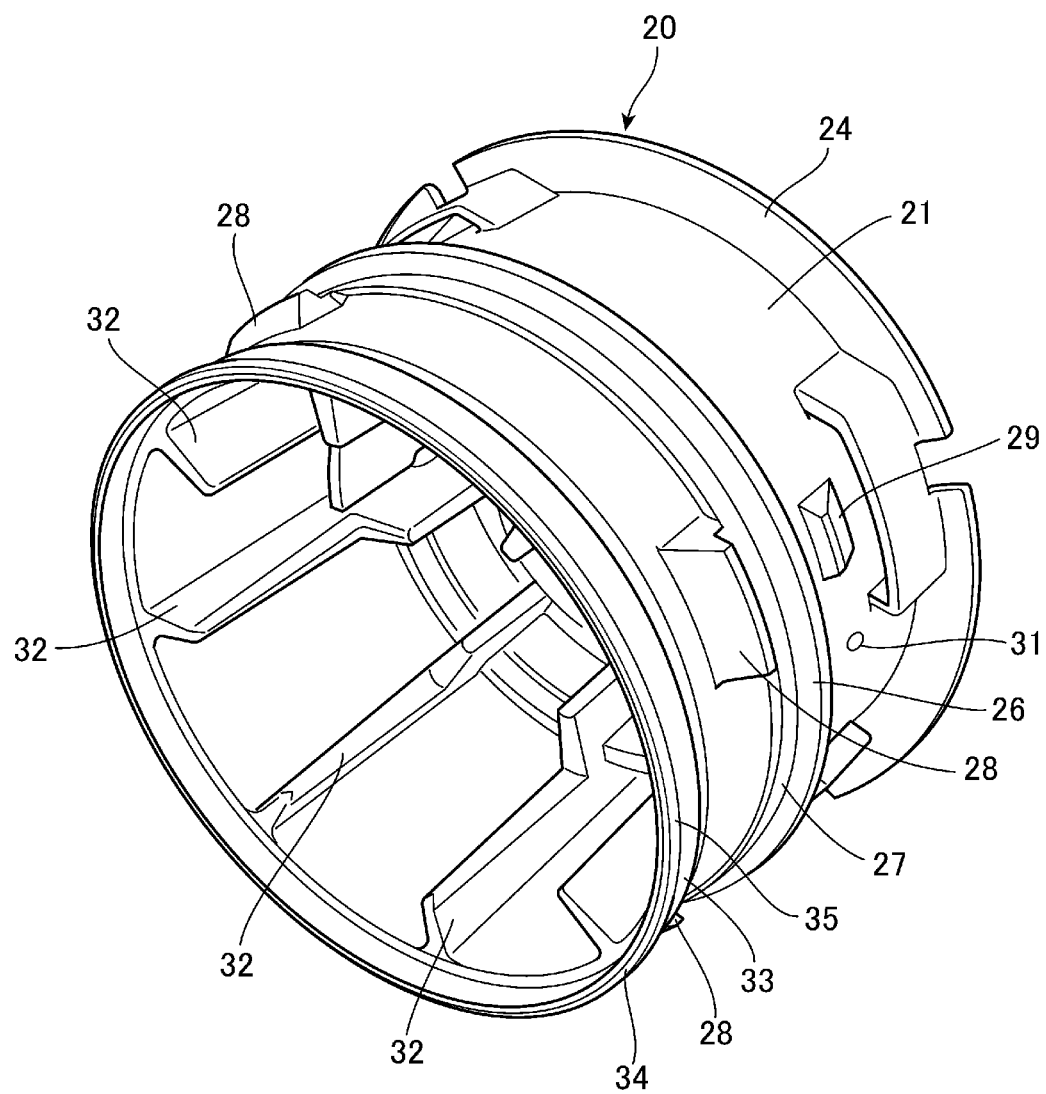
FIG. 5 is an enlarged perspective view of a housing body constituting a housing of the fill-up restriction valve when viewed from a direction different from that of FIG. 1.

As shown in FIGS. 4 and 5, the body-side peripheral wall 21 is provided with a first annular projection 26 projecting from an intermediate position in an axial direction on an outer periphery thereof. The body-side peripheral wall 21 is further provided with a second annular projection 27 projecting from a position closer to an axially lower end than the first annular projection 26 on the outer periphery thereof (see FIG. 4). As shown in FIG. 7A, in a state where the housing body 20 and the lower cap 40 are installed, the first annular projection 26 is disposed with a predetermined gap from an upper end of an outer peripheral wall 44 provided on the upper end portion of the cap-side peripheral wall 41, and the second annular projection 27 is adjacent to an inner side of the upper end of the outer peripheral wall 44.

As shown in FIGS. 1 and 5, the body-side peripheral wall 21 is further provided with a plurality of cap-side engagement protrusions 28 protruding at equal intervals in the circumferential direction from positions lower than the second annular projection 27 on the outer periphery of the body-side peripheral wall 21 The body-side peripheral wall 21 is further provided with a plurality of cover-side engagement protrusions 29 that protrude on positions above the first annular projection 26 and aligning with the plurality of cap-side engagement protrusions 28 on the outer periphery of the body-side peripheral wall 21.

As shown in FIG. 1, the second annular projection 27 is provided with a pair of positioning protrusions 30, 30 protruding on a part of an outer periphery thereof.

Figure 3:
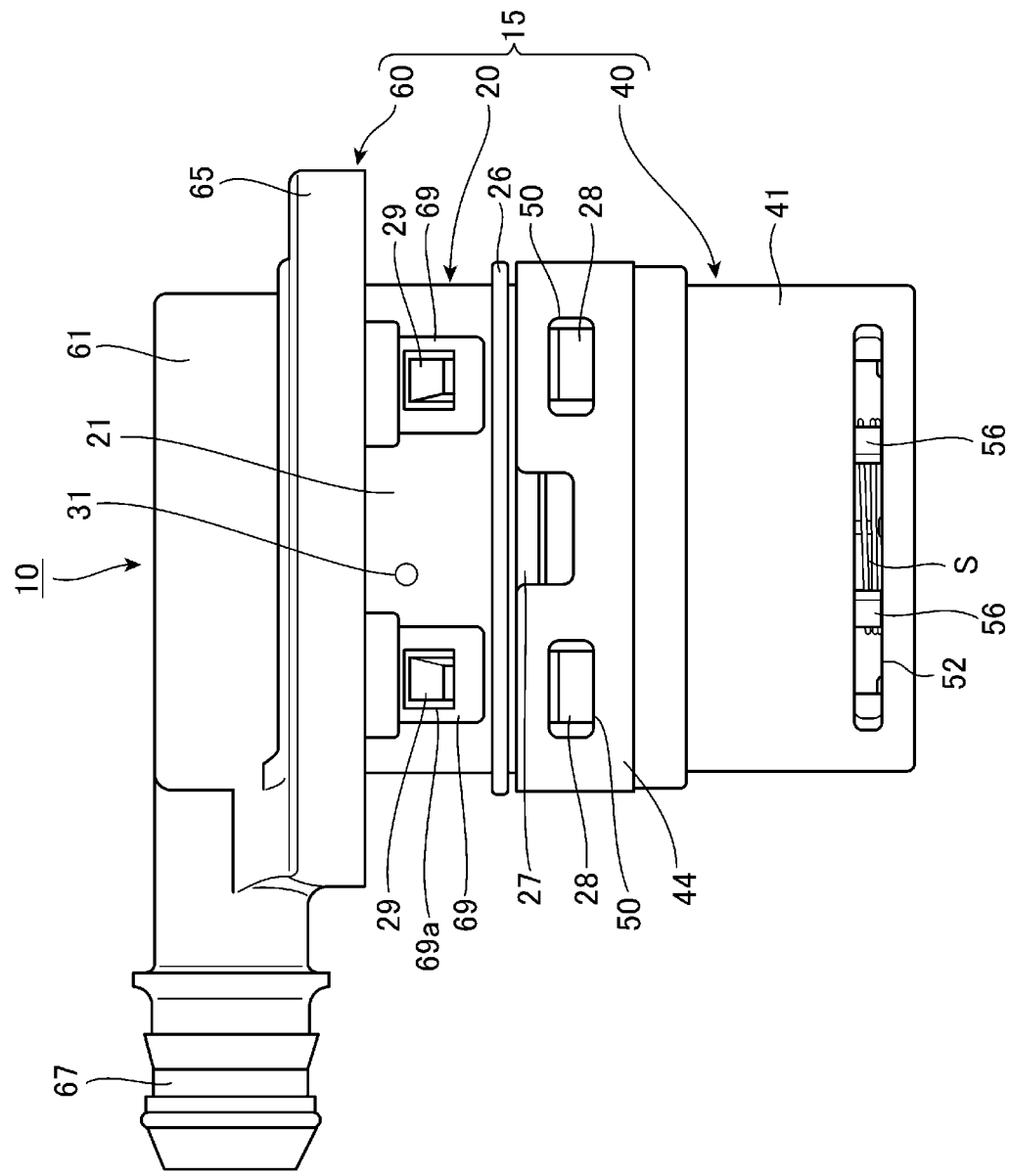
FIG. 3 is a side view of the fill-up restriction valve.

As shown in FIGS. 1 and 3, the body-side peripheral wall 21 is further formed with a communication hole 31 at two positions facing each other in the radial direction on an upper end portion side thereof. The communication hole 31 communicates the inside of the fuel tank with the inside of the valve chamber V. The communication hole 31 is a portion that is constantly maintained in a state of not being submerged except when a vehicle overturns, and flows air in the fuel tank into the valve chamber V.

As shown in FIG. 5, the body-side peripheral wall 21 is provided with guide ribs 32 extending in the axial direction at equal intervals in the circumferential direction on an inner periphery thereof. The guide ribs 32 guide an upward and downward movement of the float valve 70.

The body-side peripheral wall 21 is provided with, on the axially lower end portion, the insertion wall portion 33 that is inserted into the annular groove 46 provided in the upper end portion of the cap-side peripheral wall 41.

More specifically, as shown in FIG. 7A, the body-side peripheral wall 21 is formed with a stepped portion 33c having a stepped shape on an inner side of the axially lower end portion. The insertion wall portion 33 is displaced radially outward relative to the body-side peripheral wall 21 by the stepped portion 33c and extends downward. The insertion wall portion 33 is formed in a substantially cylindrical shape similarly to the body-side peripheral wall 21, and has a thickness (a length between the outer side surface 33a on the outer diameter side and an outer side surface 33b on the inner diameter side) smaller than a groove width of the annular groove 46 (a length between an inner side surface 46a on the outer diameter side and an inner side surface 46b on the inner diameter side).

Further, the insertion wall portion 33 is provided with a rounded R-shaped portion 34 on an outer periphery of a lowermost end thereof (see FIG. 7B), so that the insertion of the insertion wall portion 33 into the annular groove 46 is facilitated.

The insertion wall portion 33 is provided with an annular protrusion 35 at a position above the rounded R-shaped portion 34 at the lowermost end on the outer side surface 33a (the outer side surface 33a on the outer diameter side) located on the radially outer side of the insertion wall portion 33. The annular protrusion 35 continuously protrudes and extends in an annular shape (a shape that is not interrupted in the middle of the circumferential direction) along an outer periphery of the insertion wall portion 33. As shown in FIG. 7B, the annular protrusion 35 has a rounded curved shape in cross section, and a top portion thereof is in pressure-contact with the inner side surface 46a on the outer diameter side of the annular groove 46.

In a state where the insertion wall portion 33 is inserted into the annular groove 46, a gap G1 is defined between the outer side surface 33a of the insertion wall portion 33 and the annular groove 46 at a position above the annular protrusion 35. It can also be said that, in a state where the annular protrusion 35 is in pressure-contact with the inner side surface 46a on the outer diameter side of the annular groove 46, the gap G1 is defined at a position above the pressure-contact portion (the portion where the top portion of the annular protrusion 35 is in pressure-contact with the inner side surface 46a of the annular groove 46). More specifically, the gap G1 is defined between the inner side surface 46a on the outer diameter side of the annular groove 46 and the outer side surface 33a on the outer diameter side of the insertion wall portion 33 at a position above the annular protrusion 35 (a position above the pressure-contact portion of the top portion of the annular protrusion 35 and the inner side surface 46a of the annular groove 46). The liquid fuel oscillated in the fuel tank accumulates in the gap G1 (see FIG. 7A).

Further, as shown in FIG. 7B, a dimension L1 from a predetermined position P of the valve chamber V (here, a position aligned with the inner side surface 46b on the inner diameter side of the annular groove 46) to the top portion of the annular protrusion 35 is larger than a dimension L2 from the predetermined position P of the valve chamber V to the inner side surface 46a on the outer diameter side of the annular groove 46. As a result, when the insertion wall portion 33 is inserted into the annular groove 46, the annular protrusion 35 is pressed against the inner side surface 46a on the outer diameter side of the annular groove 46, and the insertion wall portion 33 is inserted into the annular groove 46 while being slightly flexibly deformed inward in the radial direction of the valve chamber V.

In the state where the insertion wall portion 33 is inserted into the annular groove 46, a lower end of the insertion wall portion 33 does not abut against a bottom surface 46c of the annular groove 46 (see FIG. 7A).

As shown in FIG. 7A, the body-side peripheral wall 21 is formed with a recessed groove 37 at a position above the gap G1 on an outer side surface 21a thereof. The recessed groove 37 communicates with the gap G1. In the embodiment, the recessed groove 37 is formed in the outer side surface 21a (the outer side surface 21a on the outer diameter side) located on the radially outer side at the axially lower end portion of the body-side peripheral wall 21. The recessed groove 37 is a groove that extends at a constant width and has a constant depth to form an annular shape continuous along the circumferential direction of the body-side peripheral wall 21.

Next, the lower cap 40 installed to the lower side of the housing body 20 will be described with reference to FIGS. 1, 4, 6, and the like.

The lower cap 40 is formed in a bottomed cap shape and includes the cap-side peripheral wall 41 having a substantially cylindrical shape and a spring support plate 53 disposed at a lower bottom portion of the cap-side peripheral wall 41. As shown in FIGS. 7A and 7B, the cap-side peripheral wall 41 is provided with an annular wall 43 annularly extending in an outer diameter direction on the upper end portion thereof, an outer peripheral wall 44 having a substantially cylindrical shape and erected from an outer peripheral edge portion of the annular wall 43, and an inner peripheral wall 45 having a substantially cylindrical shape and erected radially inward of the outer peripheral wall 44, thereby forming a double cylindrical wall. The annular groove 46 having an annular shape is provided between the outer peripheral wall 44 and the inner peripheral wall 45. The annular groove 46 has the inner side surface 46a (the inner side surface 46a on the outer diameter side) located on the radially outer side of the cap-side peripheral wall 41, the inner side surface 46b (the inner side surface 46b on the inner diameter side) located on the radially inner side of the cap-side peripheral wall 41, and the bottom surface 46c.

As described above, the insertion wall portion 33 is inserted into the annular groove 46, and the annular protrusion 35 is in pressure-contact with the inner side surface 46a on the outer diameter side of the annular groove 46. In this state, a gap G2 is defined between the inner side surface 46b on the inner diameter side of the annular groove 46 and the outer side surface 33b (the outer side surface 33b on the inner diameter side) located on the radially inner side of the insertion wall portion 33, between the bottom surface 46c of the annular groove 46 and the lower end of the insertion wall portion 33, and between the inner side surface 46a on the outer diameter side of the annular groove 46 and the outer side surface 33a on the outer diameter side of the insertion wall portion 33 at a position below the pressure-contact portion of the top portion of the annular protrusion 35 and the inner side surface 46a of the annular groove 46 (see FIG. 7A). Even when the liquid fuel accumulates in the gap G1, the top portion of the annular protrusion 35 is in pressure-contact with the inner side surface 46a of the annular groove 46 and seals the outer side surface 33a of the insertion wall portion 33 and the inner side surface 46a of the annular groove 46, so that the liquid fuel does not flow into the gap G2.

As shown in FIGS. 7A and 7B, the outer peripheral wall 44 provided on the upper end portion of the cap-side peripheral wall 41 is thicker than the inner peripheral wall 45 and extends upward longer than the inner peripheral wall 45. The outer peripheral wall 44 includes a base portion 44a erected substantially parallel to the inner peripheral wall 45, and an extending portion 44b that enlarges in diameter in the outer diameter direction from an upper end of the base portion 44a by tapered portions 47, 48 and extends upward. The tapered portion 47 located on the radially inner side of the outer peripheral wall 44 is formed at a position aligned with the recessed groove 37 provided in the body-side peripheral wall 21 in a state where the insertion wall portion 33 is inserted into the annular groove 46.

As shown in FIGS. 7A and 7B, the cap-side peripheral wall 41 is formed with an enlarged diameter portion 49 at a position above the annular groove 46 on the inner side surface of the upper end portion of the cap-side peripheral wall 41. The enlarged diameter portion 49 increases an interval between the cap-side peripheral wall 41 and the body-side peripheral wall 21. The enlarged diameter portion 49 faces the recessed groove 37 (see FIG. 7A). In the embodiment, the enlarged diameter portion 49 is formed at a position above the annular groove 46 and facing the recessed groove 37 on the inner side surface of the upper end portion of the cap-side peripheral wall 41 (here, the inner side surface of a portion of the outer peripheral wall 44 above the tapered portion 47). More specifically, the enlarged diameter portion 49 is formed on the inner side surface of the extending portion 44b constituting the outer peripheral wall 44 provided on the upper end portion of the cap-side peripheral wall 41.

Figure 2:
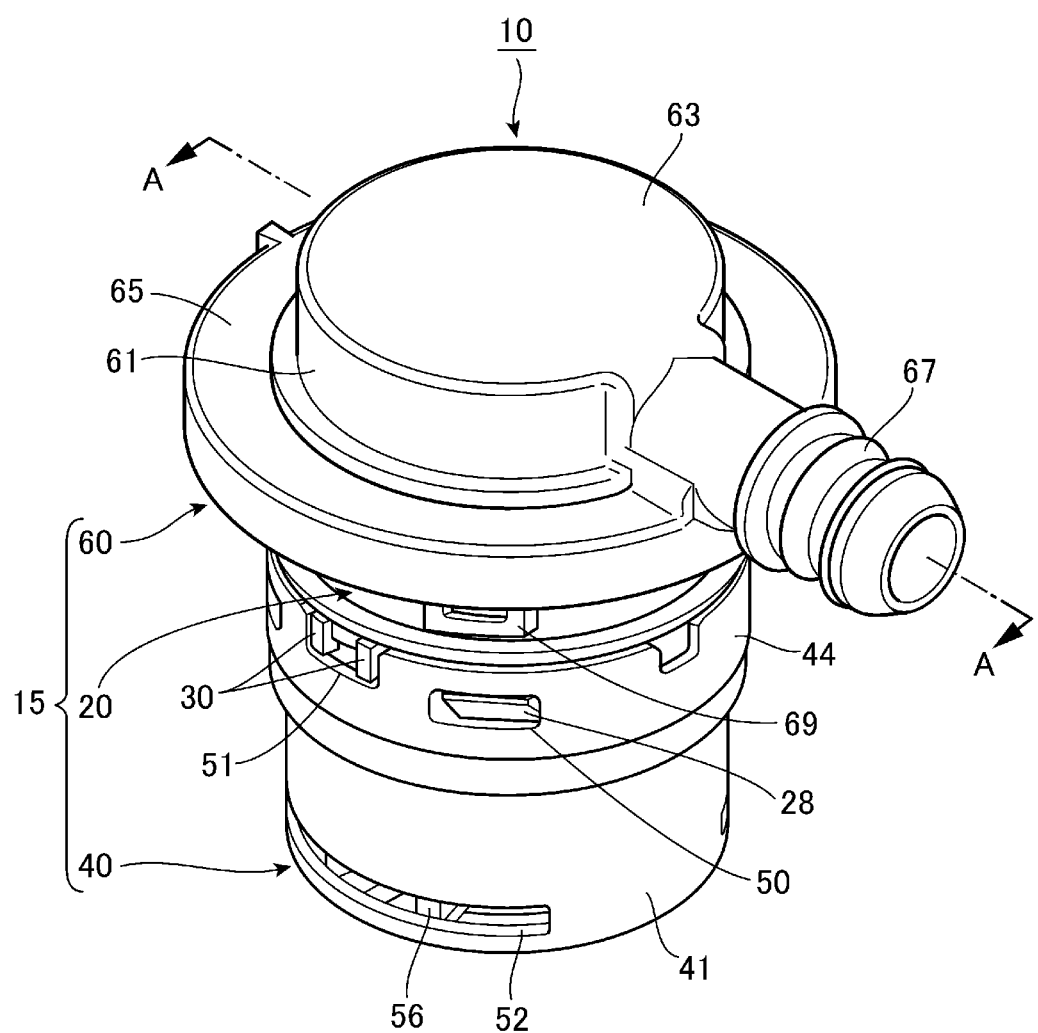
FIG. 2 is a perspective view of the fill-up restriction valve.

As shown in FIG. 1, the cap-side peripheral wall 41 is formed with, in the upper end portion, engagement holes 50 engaged with the cap-side engagement protrusions 28 provided in the housing body 20. In the embodiment, a plurality of elongated engagement holes 50 are formed at equal intervals in the circumferential direction in the upper end portion of the outer peripheral wall 44. As shown in FIG. 2, the corresponding cap-side engagement protrusions 28 of the housing body 20 are engaged with the engagement holes 50 of the lower cap 40, so that the lower cap 40 is installed to the lower side of the housing body 20. As a result, the valve chamber V communicating with the inside of the fuel tank (not shown) is formed on the lower side of the housing by the partition wall 22 (see FIG. 4).

As described above, in the fill-up restriction valve, the lower cap 40 is installed to the housing body 20 not only by the joint portion (the annular groove 46, the insertion wall portion 33, the annular protrusion 35) but also by an engagement portion (the cap-side engagement protrusions 28, the engagement holes 50). That is, the lower cap 40 is installed to the housing body 20 by the joint portion and the engagement portion.

As shown in FIG. 1, the cap-side peripheral wall 41 is further formed with, in the upper end portion, positioning recesses 51 into which the positioning protrusions 30 provided on the housing body 20 are fitted. In the embodiment, the positioning recesses 51, 51 each having a recessed groove shape are formed by cutting out two positions of the upper end portion of the outer peripheral wall 44 that face each other in the radial direction. By fitting the positioning protrusions 30 into the positioning recesses 51, the lower cap 40 is positioned and installed to the lower side of the housing body 20 in a rotation-restricted state.

As shown in FIG. 3, the cap-side peripheral wall 41 is further formed with, at a position below the joint portion (that is, the pressure-contact portion of the annular protrusion 35 and the inner side surface 46a of the annular groove 46), a fill-up detection opening 52 communicating the inside of the fuel tank with the inside of the valve chamber V. In the embodiment, the fill-up detection opening 52 has a substantially elongated hole shape extending by a predetermined length along the circumferential direction in the axially lower end portion of the cap-side peripheral wall 41. The fill-up detection openings 52 are formed at two positions of the cap-side peripheral wall 41 that face each other in the radial direction.

The fill-up detection opening 52 communicates the inside of the fuel tank with the inside of the valve chamber V and enables continuous refueling from a refueling nozzle (not shown) in a state where the fill-up detection opening 52 is not submerged (a state where the fill-up detection opening 52 is opened without being closed by the liquid fuel). In a state where the fill-up detection opening 52 is submerged (a state where the fill-up detection opening 52 is closed by the liquid fuel), the fuel liquid level in the valve chamber V rises, the float valve 70 closes the opening 23, and the continuous refueling from the refueling nozzle (not shown) is stopped.

Figure 6:
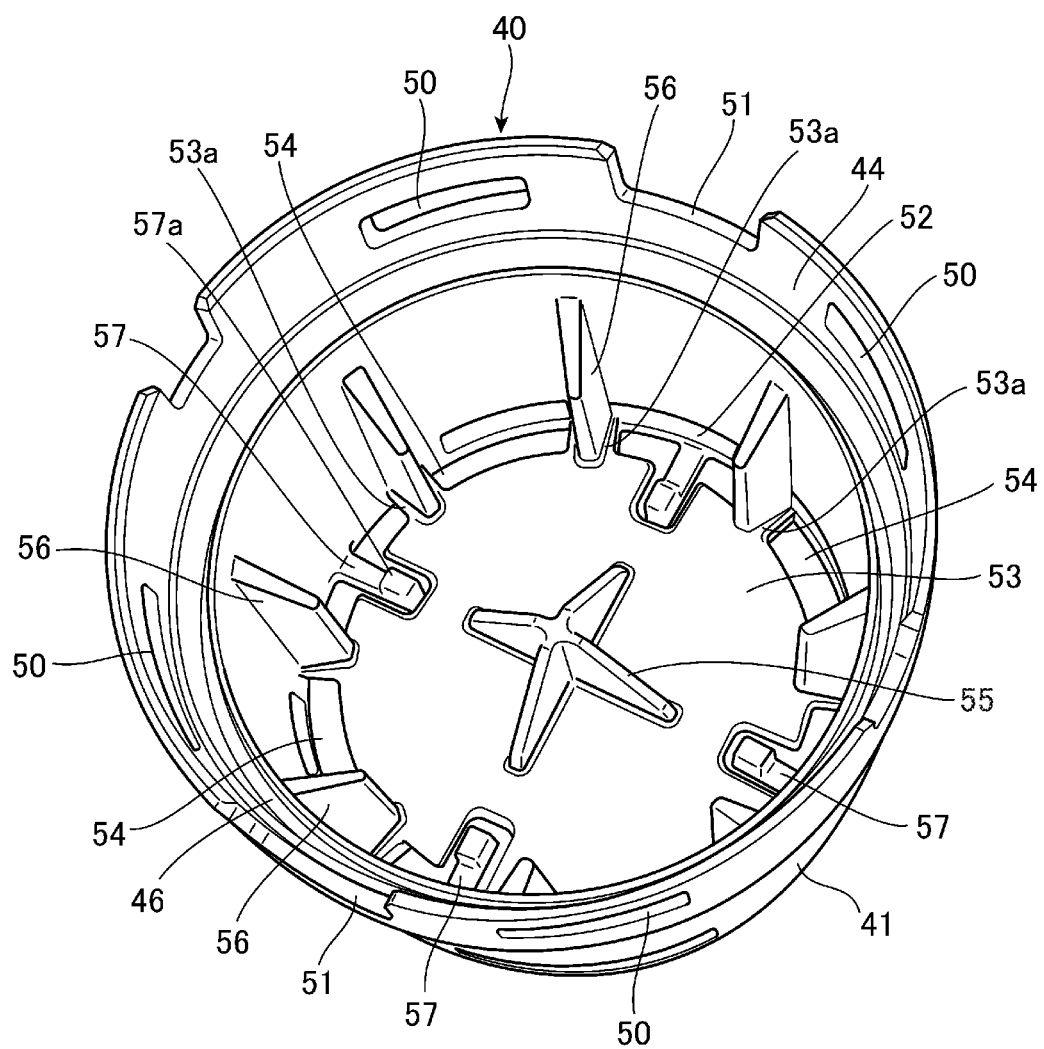
FIG. 6 is an enlarged perspective view of a lower cap constituting the housing of the fill-up restriction valve when viewed from a direction different from that of FIG. 1.

As shown in FIGS. 4 and 6, the lower cap 40 further includes the spring support plate 53 that supports the biasing spring S. As shown in FIG. 6, the spring support plate 53 has a substantially disc shape, and is disposed on an inner side of the lower end portion of the cap-side peripheral wall 41 via a plurality of support protrusions 53a protruding radially inward from an inner periphery of the lower end portion of the cap-side peripheral wall 41.

Between an outer periphery of the spring support plate 53 and the inner periphery of the cap-side peripheral wall 41, a plurality of communication ports 54 are formed to communicate the inside of the fuel tank with the inside of the valve chamber V (see FIG. 6). The spring support plate 53 is further provided with a spring support projection 55 projecting from a center of an upper surface thereof. The spring support projection 55 has a substantially cross-shaped projection shape and supports a base end portion of the biasing spring S.

As shown in FIG. 6, the cap-side peripheral wall 41 further includes guide ribs 56 that guide the upward and downward movement of the float valve 70. In the embodiment, a plurality of guide ribs 56 are provided on the inner side surface of the cap-side peripheral wall 41 at equal intervals in the circumferential direction.

A base end portion of each guide rib 56 is located at the lower end portion of the cap-side peripheral wall 41 (more specifically, located at the support protrusion 53a that supports the spring support plate 53), and each guide rib 56 has a substantially long plate shape extending along the axial direction of the cap-side peripheral wall 41. Among the plurality of guide ribs 56, predetermined guide rib 56 partitions the fill-up detection opening 52 into a plurality of regions. In the embodiment, two guide ribs 56, 56 extend from a lower bottom surface to an upper ceiling surface of the fill-up detection opening 52, and as shown in FIG. 3, when the fill-up restriction valve 10 is viewed from a lateral side, the fill-up detection opening 52 is partitioned into three regions.

As shown in FIG. 6, the cap-side peripheral wall 41 further includes a plurality of flexibly deformable strike sound suppression piece 57 extending from the inner periphery of the lower end portion thereof. Each strike sound suppression piece 57 is provided with a protrusion 57a protruding from a top end portion in an extending direction thereof. When the float valve 70 descends, the protrusion 57a abuts against a lower end surface of the float valve 70, and the strike sound suppression piece 57 flexibly deforms (see FIG. 4), thereby suppressing striking sound when the float valve 70 descends.

Next, the upper cover 60 installed to an upper side of the housing body 20 will be described with reference to FIGS. 1, 4, and the like.

The upper cover 60 has a substantial hat shape and includes a peripheral wall 61 having a substantially cylindrical outer periphery, a ceiling wall 63 disposed above the peripheral wall 61, and a flange portion 65 extending outward from a lower side of the peripheral wall 61. As shown in FIG. 4, the peripheral wall 61 is formed with a fuel vapor discharge port 67a, and a fuel vapor discharge pipe 67 extends in the outer diameter direction from a front side peripheral edge of the fuel vapor discharge port 67a. The fuel vapor discharge pipe 67 is connected to a tube (not shown) coupled to a canister.

As shown in FIG. 1, the flange portion 65 is provided with a plurality of engagement pieces 69 extending downward from predetermined positions thereof in the circumferential direction. Each engagement piece 69 is formed with an engagement hole 69a. As shown in FIG. 2, the corresponding cover-side engagement protrusions 29 of the housing body 20 are engaged with the engagement holes 69a of the engagement pieces 69 of the upper cover 60, thereby the upper cover 60 is installed to the upper side of the housing body 20 in a state where the seal ring 25 installed in the ring install groove 25a abuts against an inner periphery of the peripheral wall 61 of the upper cover 60 as shown in FIG. 4. As a result, the ventilation chamber R communicating with the outside of the fuel tank is formed on the upper side by the partition wall 22 (see FIG. 4).

Next, the float valve 70 accommodated in the valve chamber V in a manner of being movable up and down will be described with reference to FIGS. 1, 4, and the like.

As shown in FIG. 4, the float valve 70 in the embodiment includes a float body 71 that has a circular outer periphery and generates buoyancy during immersion of fuel, and a seal member 73 that is installed above the float body 71, moves up and down relative to the float body 71, and comes into contact with and separates from the opening 23.

Figure 8:
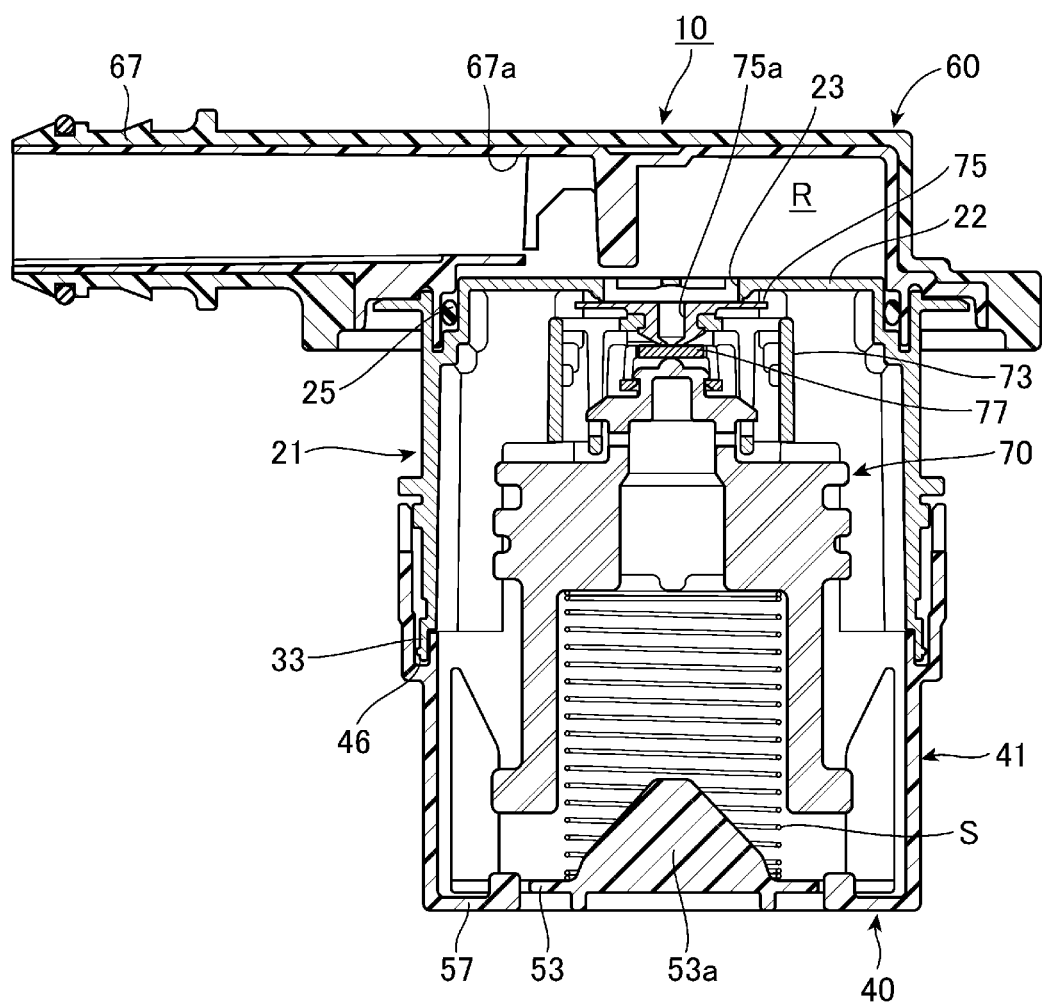
FIG. 8 is a cross-sectional schematic view of the fill-up restriction valve in a state where fill-up restriction is performed.

Above the seal member 73, a seal valve body 75 made of an elastic material such as rubber or elastic elastomer is installed. The seal valve body 75 is formed with a vent hole 75*a* penetrating a center thereof. The vent hole 75*a* is opened upward and downward. The seal valve body 75 comes into contact with and separates from a peripheral edge portion on a back side of the opening 23 to open and close the opening 23 (see FIGS. 4 and 8), thereby the float valve 70 functions as a fill-up restriction valve. The float body 71 is formed with a spring accommodating recess 71*a* opened downward, and the biasing spring S is accommodated in the spring accommodating recess 71*a*.

An intermediate valve body 77 is tiltably supported between the float body 71 and the seal member 73 (see FIG. 4). The intermediate valve body 77 normally abuts against a lower end portion of the seal valve body 75 and closes the vent hole 75*a* (see FIG. 4), and opens the vent hole 75*a* when the float body 71 descends relative to the seal member 73.

In the valve chamber V, the float valve 70 is accommodated in a manner of being movable up and down in a state where the biasing spring S is interposed between the float valve 70 and the lower cap 40, moves up by own buoyancy and a biasing force of the biasing spring S when immersed by the fuel, and moves down by own weight when not immersed by the fuel.

(Modifications)

Shapes and structures of the housing, the float valve constituting the present invention and shapes and structures of the housing body, the lower cap, the upper cover, the joint portion, and the like constituting the housing are not limited to the above embodiment.

The housing 15 in the embodiment includes the housing body 20, the lower cap 40, and the upper cover 60. However, the housing may include at least the housing body and the lower cap.

The body-side peripheral wall 21 of the housing body 20 and the cap-side peripheral wall 41 of the lower cap 40 in the embodiment each have a substantially cylindrical shape, but may also have an elliptic cylindrical shape, a square cylindrical shape, or the like.

The float valve 70 in the embodiment has a multi-component configuration including the float body 71, the seal member 73, the intermediate valve body 77, and the like. However, the float valve may include the seal member made of an elastic material installed above, as long as the float valve can open and close the opening 23

In the embodiment, one float valve 70 is accommodated in one valve chamber V formed inside the housing 15. However, for example, a plurality of float valves may be accommodated in one valve chamber (functioning as a fuel cut valve, a pressure control valve, or the like in addition to a fill-up restriction valve), a plurality of valve chambers may be defined in the housing, and the float valves may be accommodated in the respective valve chambers.

The joint portion in the embodiment includes the annular groove 46 provided in the upper end portion of the cap-side peripheral wall 41, the insertion wall portion 33 provided on the lower end portion of the body-side peripheral wall 21, and the annular protrusion 35 formed on the outer side surface 33*a* on the outer diameter side of the insertion wall portion 33, and when the insertion wall portion 33 is inserted into the annular groove 46, the annular protrusion 35 is in pressure-contact with the inner side surface 46*a* on the outer diameter side of the annular groove 46 (see FIG. 7B). However, the joint portion is not limited to this aspect.

For example, (1) the joint portion may include the annular groove provided in the lower end portion of the body-side peripheral wall, the insertion wall portion provided on the upper end portion of the cap-side peripheral wall, and the annular protrusion formed on the outer side surface on the outer diameter side of the insertion wall portion, and in a state where the insertion wall portion is inserted into the annular groove, the annular protrusion may be in pressure-contact with the inner side surface on the outer diameter side of the annular groove and the outer side surface on the outer diameter side of the insertion wall portion, (2) the joint portion may include the annular groove provided in the upper end portion of the cap-side peripheral wall, the insertion wall portion provided on the lower end portion of the body-side peripheral wall, and the annular protrusion formed on the outer side surface on the inner diameter side of the insertion wall portion, and in a state where the insertion wall portion is inserted into the annular groove, the annular protrusion may be in pressure-contact with the inner side surface on the inner diameter side of the annular groove and the outer side surface on the inner diameter side of the insertion wall portion, (3) the joint portion may include the annular groove provided in the lower end portion of the body-side peripheral wall, the insertion wall portion provided on the upper end portion of the cap-side peripheral wall, and the annular protrusion formed on the outer side surface on the inner diameter side of the insertion wall portion, and in a state where the insertion wall portion is inserted into the annular groove, the annular protrusion may be in pressure-contact with the inner side surface on the inner diameter side of the annular groove and the outer side surface on the inner diameter side of the insertion wall portion, (4) the joint portion includes the annular groove provided in the upper end portion of the cap-side peripheral wall, the insertion wall portion provided on the lower end portion of the body-side peripheral wall, and the annular protrusion formed on the inner side surface on the outer diameter side of the annular groove, and in a state where the insertion wall portion is inserted into the annular groove, the annular protrusion is in pressure-contact with the outer side surface on the outer diameter side of the insertion wall portion and the inner side surface on the outer diameter side of the annular groove, (5) the joint portion includes the annular groove provided in the upper end portion of the cap-side peripheral wall, the insertion wall portion provided on the lower end portion of the body-side peripheral wall, and the annular protrusion formed on the inner side surface on the inner diameter side of the annular groove, and in a state where the insertion wall portion is inserted into the annular groove, the annular protrusion is in pressure-contact with the outer side surface on the inner diameter side of the insertion wall portion and the inner side surface on the inner diameter side of the annular groove.
(6) the joint portion may include the annular groove provided in the lower end portion of the body-side peripheral wall, the insertion wall portion provided on the upper end portion of the cap-side peripheral wall, and the annular protrusion formed on the inner side surface on the outer diameter side of the annular groove, and in a state where the insertion wall portion is inserted into the annular groove, the annular protrusion may be in pressure-contact with the outer side surface on the outer diameter side of the insertion wall portion and the inner side surface on the outer diameter side of the annular groove, and
(7) the joint portion may include the annular groove provided in the lower end portion of the body-side peripheral wall, the insertion wall portion provided on the upper end portion of the cap-side peripheral wall, and the annular protrusion formed on the inner side surface on the inner diameter side of the annular groove, and in a state where the insertion wall portion is inserted into the annular groove, the annular protrusion may be in pressure-contact with the outer side surface on the inner diameter side of the insertion wall portion and the inner side surface on the inner diameter side of the annular groove.

FIG. 9A shows the configuration of (1) described above. That is, in the joint portion in the modification, the annular groove 46 is provided in the lower end portion of the body-side peripheral wall 21, the insertion wall portion 33 is provided on the upper end portion of the cap-side peripheral wall 41, the annular protrusion 35 is formed on the outer side surface 33a on the outer diameter side of the insertion wall portion 33, and in a state where the insertion wall portion 33 is inserted into the annular groove 46, the annular protrusion 35 is in pressure-contact with the inner side surface 46a on the outer diameter side of the annular groove 46 and the outer side surface 33a on the outer diameter side of the insertion wall portion 33.

The annular protrusion 35 in the embodiment has a rounded curved surface shape in cross section, and is integrally formed with the outer side surface 33a on the outer diameter side of the insertion wall portion 33 (see FIG. 7B). Alternatively, the annular protrusion may have, for example, a trapezoidal shape in cross section, a rectangular shape in cross section, or a mountain shape having a substantially triangular shape in cross section.

The joint portion may be provided separately from the insertion wall portion and the annular groove, and may have an annular seal portion disposed between the insertion wall portion and the annular groove. The joint portion in the modification shown in FIG. 9B includes an annular seal member 35A separated from the insertion wall portion 33 and the annular groove 46, and in a state where the insertion wall portion 33 is inserted into the annular groove 46, the annular seal member 35A is in pressure-contact with the outer side surface 33b on the inner diameter side of the insertion wall portion 33 and the inner side surface 46b on the inner diameter side of the annular groove 46.

(Functions and Effects)

Next, functions and effects of the fill-up restriction valve 10 having the above-described configuration will be described.

Members constituting the fill-up restriction valve 10 can be assembled, for example, as follows. First, after the float valve 70 is accommodated in the valve chamber V of the housing body 20, the biasing spring S is accommodated in the spring accommodating recess 71a of the float valve 70.

Thereafter, the plurality of engagement holes 50 of the lower cap 40 are aligned with the corresponding cap-side engagement protrusions 28 of the housing body 20, the annular groove 46 in the upper end portion of the cap-side peripheral wall 41 is aligned with the insertion wall portion 33 on the lower end portion of the body-side peripheral wall 21, and the lower cap 40 is positioned to the lower side of the housing body 20. In this state, as shown in FIG. 7B, the insertion wall portion 33 is disposed above the annular groove 46. Then, as shown by an arrow in FIG. 7B, the housing body 20 is pressed into the lower cap 40, or the lower cap 40 is pressed into the housing body 20.

Then, the top portion of the annular protrusion 35 is pressed against the inner peripheral surface of the outer peripheral wall 44 on the upper end portion of the cap-side peripheral wall 41, and the insertion wall portion 33 is inserted into the annular groove 46 while being slightly flexibly deformed inward in the radial direction of the valve chamber V. As shown in FIG. 7A, the top portion of the annular protrusion 35 is in pressure-contact with the inner side surface 46a on the outer diameter side of the annular groove 46. Since the flexibly deformed insertion wall portion 33 attempts to elastically return outward in the radial direction of the valve chamber V, the annular protrusion 35 is in close pressure-contact with the inner side surface 46a on the outer diameter side of the annular groove 46. At the same time, since the cap-side engagement protrusions 28 of the housing body 20 are engaged with the engagement holes 50 of the lower cap 40, the lower cap 40 is installed to the lower side of the housing body 20 by the joint portion (the annular groove 46, the insertion wall portion 33, the annular protrusion 35) and the engagement portion (the cap-side engagement protrusions 28, the engagement holes 50) (see FIGS. 2 to 4). In a state where the annular protrusion 35 is in pressure-contact with the inner side surface 46a of the annular groove 46, the gap G1 is defined at a position above the pressure-contact portion (see FIG. 7A).

As described above, when the upper cover 60 is installed to the upper side of the housing body 20, the corresponding cover-side engagement protrusions 29 of the housing body 20 are engaged with the engagement holes 69a of the engagement pieces 69 of the upper cover 60, thereby the upper cover 60 is installed to the upper side of the housing body 20 as shown in FIGS. 2 to 4.

As shown in FIG. 4, in a state where the fuel is not sufficiently supplied into the fuel tank and the float valve 70 is not immersed in the fuel, the float valve 70 descends by own weight and the opening 23 is opened, and thus the valve chamber V communicates with the ventilation chamber R through the opening 23.

When the fuel is supplied into the fuel tank in this state, air in the fuel tank mainly flows into the valve chamber V from the communication ports 54 of the lower cap 40, passes through the gap between the float valve 70 and the cap-side peripheral wall 41 as well as the body-side peripheral wall 21 and flows upward, flows into the ventilation chamber R from the opening 23, and is discharged to the canister outside the fuel tank. In this way, the air in the fuel tank is discharged to the outside of the fuel tank, so that the fuel can be supplied into the fuel tank.

When the fuel is supplied into the fuel tank from the state shown in FIG. 4, the fuel flows into the valve chamber V from the communication ports 54 of the lower cap 40, and the float body 71 of the float valve 70 is immersed in the fuel. When the fuel liquid level in the fuel tank reaches a set fill-up liquid level, that is, when the fill-up detection opening 52 is closed and submerged, the float valve 70 rises due to the biasing force of the biasing spring S and the buoyancy of the float body 71 of the float valve 70, and the seal valve body 75 abuts against the peripheral edge portion on the back side of the opening 23 and closes the opening 23. As a result, an air flow between the valve chamber V and the ventilation chamber R through the opening 23 is blocked. Then, the fuel in the fuel tank rises through a refueling pipe provided in the fuel tank, and comes into contact with a fill-up detection sensor of a refueling nozzle inserted into a refueling port to detect the fill-up, and thus the refueling into the fuel tank is stopped and the fill-up restriction can be implemented.

In the fill-up restriction valve 10, as shown in FIGS. 4 and 7, in a state where the insertion wall portion 33 provided on the lower end portion of the body-side peripheral wall 21 is inserted into the annular groove 46 provided in the upper end portion of the cap-side peripheral wall 41, the annular protrusion 35 is in pressure-contact with the inner side surface 46a on the outer diameter side of the annular groove 46 and the outer side surface 33a on the outer diameter side of the insertion wall portion 33. Accordingly, when the lower cap 40 is installed to the housing body 20 by the joint portion, the sealing performance between the housing body 20 and the lower cap 40 can be improved, and the filling-up detection accuracy can be improved. The same effect can also be obtained when the joint portion includes the annular groove provided in the lower end portion of the body-side peripheral wall, the insertion wall portion provided on the upper end portion of the cap-side peripheral wall, the annular protrusion formed on one of the outer side surface of the insertion wall portion and the inner side surface of the annular groove, or the annular seal member disposed between the insertion wall portion and the annular groove, and the annular protrusion or the seal member is in press-contact with the annular groove and the insertion wall portion in a state where the insertion wall portion is inserted into the annular groove.

In the embodiment, the annular groove 46 is provided in the upper end portion of the cap-side peripheral wall 41, the insertion wall portion 33 is provided on the lower end portion of the body-side peripheral wall 21, the annular protrusion 35 is disposed on the outer side surface 33a of the insertion wall portion 33, and the gap G1 is defined at a position above the annular protrusion 35 in the state where the insertion wall portion 33 is inserted into the annular groove 46 (see FIG. 7A).

According to the above aspect, since the gap G1 is defined at a position above the annular protrusion 35 in the state where the insertion wall portion 33 is inserted into the annular groove 46, as shown in FIG. 7A, the liquid fuel can accumulate in the gap G1 by the oscillation of the fuel or the like. Since the fuel accumulating in the gap G1 can function as a so-called liquid seal (seal by liquid), the sealing performance between the housing body 20 and the lower cap 40) can be further improved. The same effect can also be obtained when the annular seal member is disposed on the outer side surface of the insertion wall portion.

In the embodiment, as shown in FIG. 7A, the body-side peripheral wall 21 is formed with the recessed groove 37 at a position above the gap G1 on the outer side surface 21a thereof. The recessed groove 37 communicates with the gap G1.

According to the above aspect, since the recessed groove 37 having the above-described configuration is provided, the liquid fuel can accumulate not only in the gap G1 but also in the recessed groove 37, and the amount of the accumulating liquid fuel can be increased. As a result, it is easy to maintain the liquid seal function by suppressing shortage of the liquid fuel accumulating in the gap G1, and thus the sealing performance between the housing body 20 and the lower cap 40 can be improved over a long period of time.

In the present embodiment, as shown in FIG. 7A, the cap-side peripheral wall 41 is formed with the enlarged diameter portion 49 at a position above the annular groove 46 on the inner side surface of the upper end portion of the cap-side peripheral wall 41. The enlarged diameter portion 49 increases the interval between the cap-side peripheral wall 41 and the body-side peripheral wall 21.

According to the above aspect, since the enlarged diameter portion 49 having the above-described configuration is provided, the liquid fuel can accumulate in the enlarged diameter portion 49 in addition to the gap G1, and as a result, the amount of the accumulating liquid fuel can be further increased, and the liquid seal function can be more easily maintained. In addition, since the enlarged diameter portion 49 is provided, the insertion wall portion 33 is less likely to interfere with the inner side surface of the upper end portion of the cap-side peripheral wall 41 when the insertion wall portion 33 is inserted into the annular groove 46, and thus the insertion wall portion 33 is easily inserted into the annular groove 46.

In the embodiment, as shown in FIG. 7A, the body-side peripheral wall 21 is formed with the recessed groove 37 communicating with the gap G1 at a position above the gap G1 on the outer side surface 21a thereof, and the enlarged diameter portion 49 faces the recessed groove 37.

According to the above aspect, since the enlarged diameter portion 49 faces the recessed groove 37, the enlarged diameter portion 49 can be further enlarged by the recessed shape of the recessed groove 37. As a result, the amount of the accumulating liquid fuel can be further increased, and thus the liquid seal function can be easily maintained over a long period of time.

In the embodiment, the cap-side peripheral wall 41 includes the fill-up detection opening 52, which is formed at a position below the pressure-contact portion of the annular protrusion 35 and the inner side surface 46a of the annular groove 46 and communicates the inside of the fuel tank with the inside of the valve chamber V. and the guide ribs 56 that guide the upward and downward movement of the float valve 70, and the plurality of guide ribs 56 are disposed on the inner periphery of the cap-side peripheral wall 41 to partition the fill-up detection opening 52 into a plurality of regions (see FIGS. 3 and 6).

According to the above aspect, the guide ribs 56 are disposed on the inner periphery of the cap-side peripheral wall 41 to partition the fill-up detection opening 52 into a plurality of regions. Accordingly, when gas such as air or fuel vapor is about to flow into the valve chamber V from the fill-up detection opening 52 at the time of refueling to the fuel tank or at the time of an increase in pressure in the fuel tank, the plurality of guide ribs 56 can make it less likely for the gas to flow into the valve chamber V, and the float valve 70 can be suppressed from blowing up. As a result, the float valve 70 can be suppressed from rising and closing the opening 23 at a pressure lower than a set valve closing pressure.

Other Embodiments of Fill-up Restriction Valve

Figure 10:
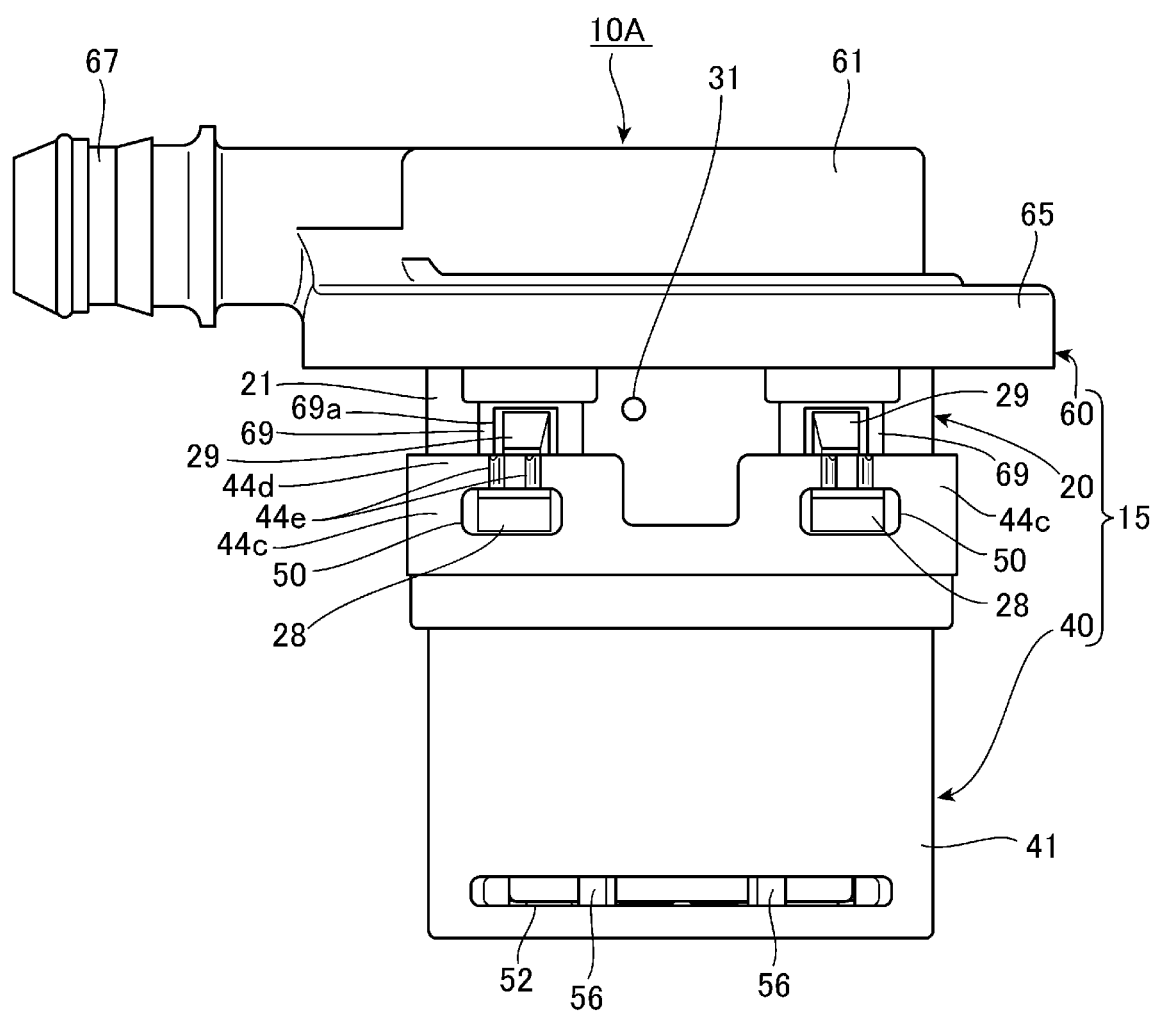
FIG. 10 is a side view showing another embodiment of a fill-up restriction valve according to the present invention.
Figure 11:
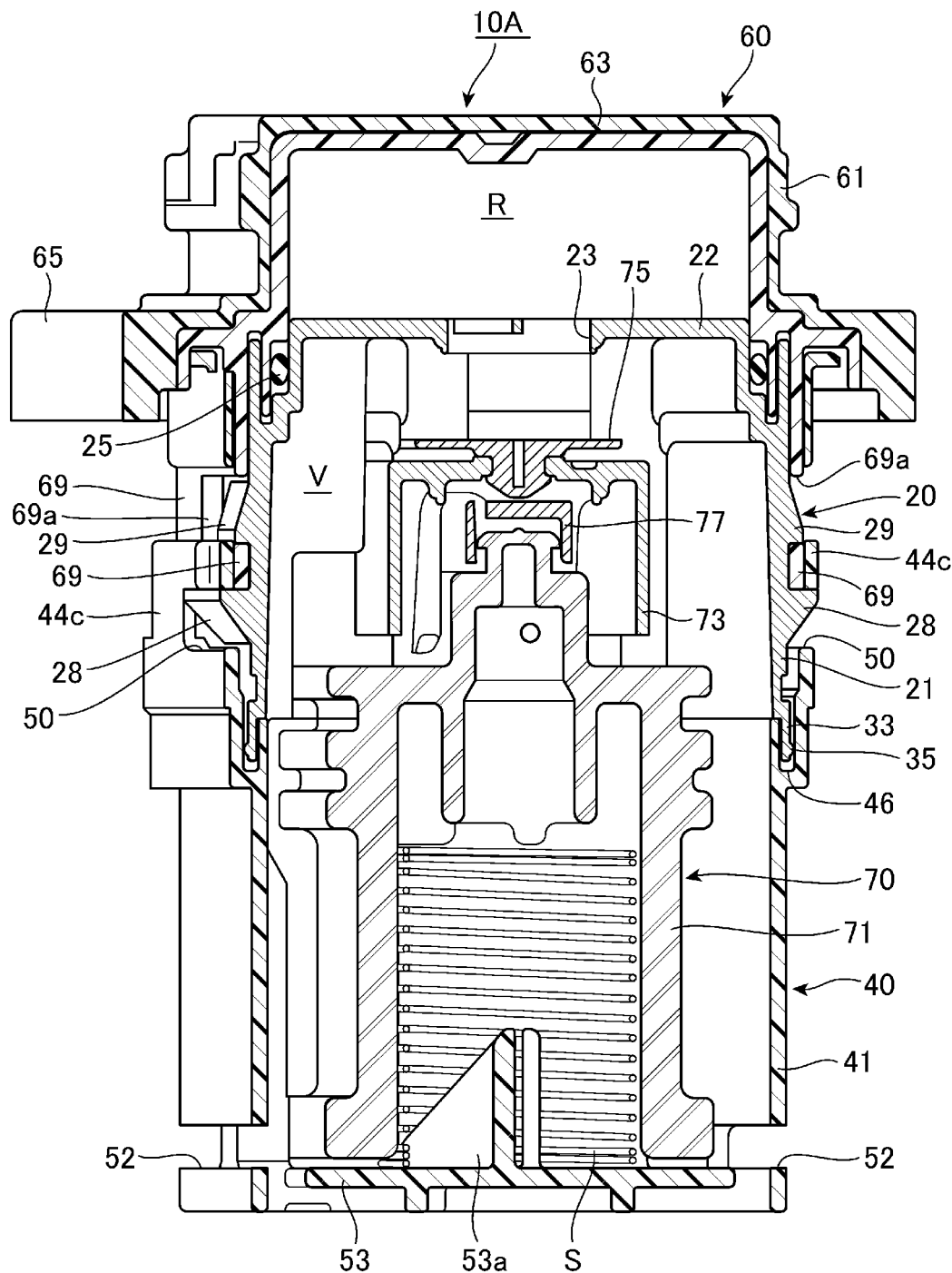
FIG. 11 is a cross-sectional view of the fill-up restriction valve.

FIGS. 10 and 11 show another embodiment of a fill-up restriction valve according to the present invention. Substantially the same portions as those in the above embodiment are denoted by the same reference numerals, and description thereof will be omitted.

In a fill-up restriction valve 10A in the embodiment, the housing 15 includes the upper cover 60, and a first engagement piece extends downward from the upper cover 60. In the embodiment, each of the engagement pieces 69 serves as a "first engagement piece" in the present invention. The engagement pieces 69 are engaged with the cover-side engagement protrusions 29 (serving as a "first engagement protrusion" in the present invention, respectively) provided on the housing body 20.

A second engagement piece is formed on the lower cap 40. In the embodiment, the upper end portion of the outer peripheral wall 44 of the cap-side peripheral wall 41 is separated by the plurality of positioning recesses 51 to form second engagement pieces 44c. Each of the second engagement pieces 44c is formed with the engagement hole 50. The second engagement pieces 44c are engaged with the cap-side engagement protrusions 28 (serving as a "second engagement protrusion" in the present invention, respectively) provided on the housing body 20, and are disposed outside the engagement pieces 69 serving as the first engagement pieces. Each second engagement piece 44c is provided with a pair of protrusions 44e, 44e protruding on an outer peripheral surface of an upper side portion 44d thereof, and the rigidity of the upper side portion 44d of the second engagement piece 44c is improved.

As described above, in the fill-up restriction valve 10A in the embodiment, the housing 15 further includes the upper cover 60 installed to the upper side of the housing body 20, and the first engagement pieces (the engagement pieces 69) is formed on the upper cover 60. The second engagement pieces 44c are formed on the lower cap 40. The housing body 20 is provided with the first engagement protrusions (the cover-side engagement protrusions 29) engaged with the engagement pieces 69 that are the first engagement pieces and the second engagement protrusions (the cap-side engagement protrusions 28) engaged with the second engagement pieces 44c. As shown in FIGS. 10 and 11, the second engagement pieces 44c engage with the cap-side engagement protrusions 28 that are the second engagement protrusions in a state where the second engagement pieces 44c are disposed outside the engagement pieces 69 that are the first engagement pieces.

The fill-up restriction valve 10A having the above configuration has the following effects.

That is, when the lower cap 40 and the upper cover 60 are installed to the lower side and the upper side of the housing body 20, the first engagement protrusions (the cover-side engagement protrusions 29) of the housing body 20 are engaged with the first engagement pieces (the engagement pieces 69) of the upper cover 60, and the second engagement protrusions (the cap-side engagement protrusions 28) of the housing body 20 are engaged with the second engagement pieces 44c of the lower cap 40.

At this time, as shown in FIGS. 10 and 11, the second engagement pieces 44c of the lower cap 40 are engaged with the second engagement protrusions (cap-side engagement protrusions 28) of the housing body 20 in a state where the second engagement pieces 44c are disposed outside the first engagement pieces (the engagement pieces 69) of the upper cover 60. Therefore, the outward deformation of the engagement pieces 69 that are the first engagement pieces can be suppressed by the second engagement pieces 44c. As a result, the engagement pieces 69 that are the first engagement pieces can be suppressed from being disengaged from the cover-side engagement protrusions 29 that are the first engagement protrusions, and the install strength between the housing body 20 and the upper cover 60 can be improved.

The present invention is not limited to the embodiments described above, various modifications can be made within the gist of the present invention, and such modifications are also included in the scope of the present invention.

What is claimed is:

1. A fill-up restriction valve comprising:
a housing, in which a valve chamber configured to communicate with inside of a fuel tank is provided on a lower side by a partition wall, a ventilation chamber configured to communicate with outside of the fuel tank is provided on an upper side by the partition wall, and an opening configured to communicate the valve chamber with the ventilation chamber is formed in the partition wall; and
a float valve accommodated in the valve chamber in a manner of being movable up and down, the float valve configured to close the opening when a fuel liquid level rises to a predetermined height during refueling into the fuel tank,
wherein the housing includes
a housing body including a body-side peripheral wall, and
a lower cap including a cap-side peripheral wall, the lower cap
being installed to a lower side of the housing body by a joint portion, wherein the joint portion includes
an annular groove provided in one of an upper end portion of the cap-side peripheral wall and a lower end portion of the body-side peripheral wall,
an insertion wall portion provided on an other one of the upper end portion of the cap-side peripheral wall and the lower end portion of the body-side peripheral wall, the insertion wall portion configured to be inserted into the annular groove, and
an annular protrusion formed on one of the insertion wall portion and the annular groove, or an annular seal member disposed between the insertion wall portion and the annular groove, and
wherein the annular protrusion or the annular seal member is configured to be in pressure-contact with the annular groove and the insertion wall portion and a gap is defined between an outer side surface of the insertion wall portion and the annular groove at a position above the annular protrusion or the annular seal member, in a state where the insertion wall portion is inserted into the annular groove.

2. The fill-up restriction valve according to claim 1, wherein the annular groove is provided in the upper end portion of the cap-side peripheral wall, and the insertion wall portion is provided on the lower end portion of the body-side peripheral wall, and
wherein the annular protrusion or the annular seal member is disposed on the outer side surface of the insertion wall portion.

3. The fill-up restriction valve according to claim 2, wherein a recessed groove configured to communicate with the gap is formed in an outer side surface of the body-side peripheral wall at a position above the gap.

4. The fill-up restriction valve according to claim 2, wherein an enlarged diameter portion is formed on an inner side surface of the upper end portion of the cap-side peripheral wall at a position above the annular groove, and the enlarged diameter portion is configured to widen an interval between the cap-side peripheral wall and the body-side peripheral wall.

5. The fill-up restriction valve according to claim 4, wherein a recessed groove configured to communicate with the gap is formed in an outer side surface of the body-side peripheral wall at a position above the gap, and wherein the enlarged diameter portion faces the recessed groove.

* * * * *